United States Patent [19]
Simokat et al.

[11] 3,968,333
[45] July 6, 1976

[54] BATTERY CHARGER CONTROL CIRCUIT FOR TELEPHONE TRANSMISSION SYSTEMS

[75] Inventors: Frank L. Simokat, Euless; LeRoy S. Baker, Grapevine, both of Tex.

[73] Assignee: Superior Continental Corporation, Hickory, N.C.

[22] Filed: Sept. 18, 1973

[21] Appl. No.: 398,448

[52] U.S. Cl. .......................... 179/16 A; 179/2.5 R
[51] Int. Cl.² ...................... H04H 1/08; H04M 1/00
[58] Field of Search .......... 179/2.5 R, 16 A, 16 AA, 179/26, 81 R, 175.3 R, 175.2 R, 175.2 C; 320/2

[56] References Cited
UNITED STATES PATENTS 3,780,228   12/1973   Stewart .......................... 179/2.5 R
3,840,703   10/1974   Stewart .......................... 179/2.5 R Primary Examiner—Thomas A. Robinson
Attorney, Agent, or Firm—Roy B. Moffitt; Harrison E. McCandlish

[57] ABSTRACT

A telephone transmission system in which a telephone transmission line connects a central office d.c. power source to a battery charging control circuit to apply an input voltage to the control circuit, in which a battery charger connects a rechargeable battery to said control circuit to draw battery charging current from the transmission line under the control of the control circuit, in which the control circuit is rendered effective by a lowering of the input voltage to at least a predetermined value to effectively disconnect the battery charger and the battery from the transmission line for a period that exceeds the interval in which the input voltage is lowered.

22 Claims, 1 Drawing Figure

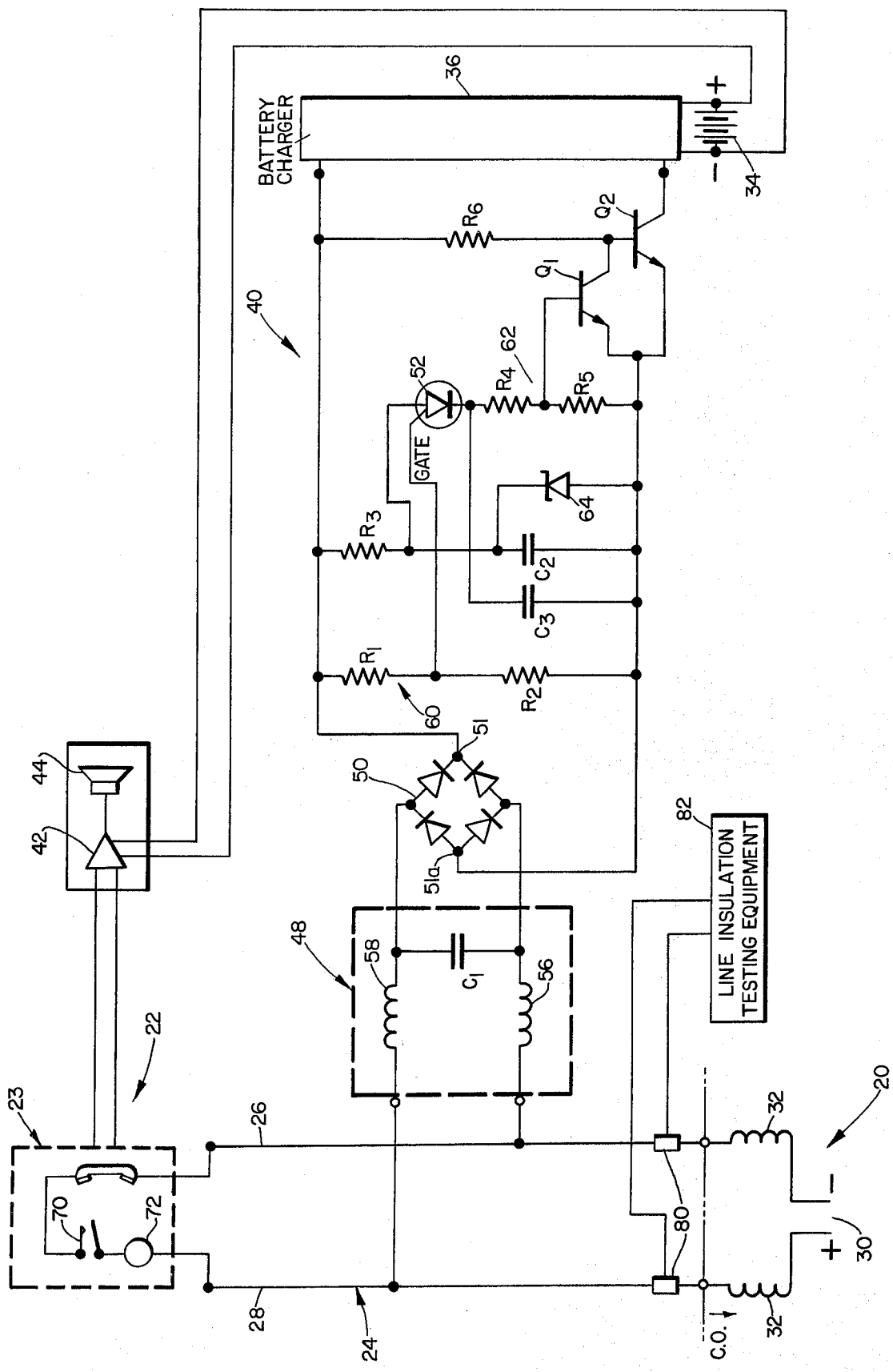

BATTERY CHARGER CONTROL CIRCUIT FOR TELEPHONE TRANSMISSION SYSTEMS

FIELD OF INVENTION

This invention relates to battery charging control circuits for telephone transmission systems of the type which have a battery located remotely from a central office and which draw current from the telephone transmission circuit to charge the battery.

BACKGROUND

In operation of a telephone system there are many instances where it is advantageous to power equipment which is remote from the central office by a battery which is also located remotely from the central office. For uninterrupted service it is desirable to automatically charge the remote battery. This is typically accomplished by drawing current from the subscriber's transmission line.

Battery charging control circuits which have previously been proposed customarily connect the remote battery directly to the telephone transmission line which, in turn, connects the subscriber's telephone to a central office. With these prior circuits current is drawn from the central office. With these prior circuits current is drawn from the central office d.c. power source to charge the remote battery.

Some attempts at charging the remote battery in this manner have been unsatisfactory because they resulted in distortion of dialing pulses or caused lock-up of certain telephone system circuits. Dialing pulse distortion occurs when significant battery charging current is drawn from the telephone transmission circuit during the dialing sequence or interval. Lock-up of the telephone circuit may occur when there is an excessive current drain from the telephone circuit at the time when the subscriber hangs up or very shortly after the subscriber hangs up.

The practice of drawing battery-charging current from the telephone transmission circuit has also created a significant problem in making line insulation tests with such currently used automatic testing equipment as the Western Electric ALIT (Automatic Line Insulation Testing). In an automatic line insulation test the transmission line to be tested is switched from the central office equipment to the test equipment to check the telephone transmission for current leakage. When test equipment such as the Western Electric ALIT is used, however, prior battery charging circuits which are known to applicant are not effective to prevent battery-charging current from being drawn from the transmission line for the duration of the test. As a result, the ALIT test equipment would yield erroneous results for tests on lines that are connected to the prior battery charging circuits.

In an effort to avoid dialing pulse distortion and circuit lock-up certain proposals for battery charging circuits have been made in U.S. Pat. No. 3,510,584 which issued to L. Q. Krasin et al on May 5, 1970. However, when such test equipment as the Western Electric ALIT is used, none of the three battery charging circuits described in this patent adequately prevents battery charging current from being drawn from the telephone transmission line during a line insulation test.

Furthermore, the first two battery charging circuit embodiments in U.S. Pat. No. 3,510,584 will not be adequately effective to prevent circuit lock-up if the voltage, which is applied to the battery charging circuit when the subscriber's telephone is off-hook, is relatively high. The magnitude of this applied voltage increases as the length of the transmission line between the battery charging circuit and the central office is decreased.

The third battery charging circuit embodiment in U.S. Pat. No. 3,510,584 attempts to avoid interference with the normal operation o the telephone transmission circuit by minimizing the current drain on the telephone transmission circuit. This embodiment, however, suffers from the disadvantage in that it causes a continuous current drain which is not enough to effect reliable operation for all expected conditions.

Furthermore, none of the three battery charging circuits in U.S. Pat. No. 3,510,584 is constructed to accommodate a battery charger. Use of a battery charger affords the advantage of charging the battery with a current magnitude that is greater than current magnitude which is drawn from the power supply source.

SUMMARY AND OBJECTS OF INVENTION

As compared with the prior circuits discussed above, the present invention provides a novel battery charging control circuit which has the following objects and advantages:

1. Automatically prevents battery charging current from being drawn from the telephone transmission circuit for a period that is sufficiently long to cover the duration of such tests as the automatic line insulation tests with such equipment as the Western Electric ALIT.

2. Automatically prevents battery charging current from being drawn from the telephone transmission circuit throughout the interval in which the subscriber's telephone is off-hook to avoid dialing pulse distortion and interference with the normal operation of the telephone transmission circuit;

3. Automatically prevents battery charging current from being drawn from the telephone transmission for a significant period after the subscriber hangs up to avoid circuit lock-up; and 4. Accommodates a battery charger for achieving efficient use of power to charge the remote battery.

The first three objects mentioned above are achieved in the illustrated embodiment of this invention by storing a charge on a capacitor and by utilizing the stored charge in such a manner as to prevent battery-charging current from being drawn from the transmission line for the duration of such tests as the previously mentioned line insulation test and also for a predetermined time after the subscriber hangs up following the off-hook use of the telephone transmission circuit.

More particularly, the first three objects mentioned above are achieved in the illustrated embodiment by storing a charge on a first capacitor during the idle time of the subscriber's line (which is also referred to herein as the telephone transmission circuit or simply as the telephone circuit), by rapidly transferring a portion of the charge on the first capacitor to charge a second capacitor when the subscriber's telephone is transferred to its off-hook condition or when the circuit for supplying battery-charging current is momentarily opened to lower the transmission line voltage which is applied to the circuit of this invention, by operating a switching device (such as a transistor) as a result of current flow from either the transmission line or the charged capacitors to effectively disconnect the remote battery from the transmission line upon lowering the applied voltage to zero or to some off-hook value, and by utilizing the charge which is stored on the second capacitor to delay the reconnection of the remote battery for a predetermined interval after the applied voltage is increased upon returning the subscriber's telephone to its on-hook condition or upon connecting the transmission line to such test equipment as the Western Electric ALIT.

It is understood that the subscriber's line, which includes, among other things, the subscriber's telephone and the transmission line connecting the subscriber's telephone to the central office, is said to be idle when the subscriber's telephone is on-hook to provide an open circuit and hence a relatively high voltage across the transmission line conductors.

According to a further feature of this invention, a battery charger is connected to the remote battery, and the control circuit of this invention is constructed to connect the battery charger to the telephone transmission line. The switching device for temporarily disconnecting the battery charger, and, hence, the remote battery from the transmission line is a semiconducting switching device such as a transistor which is connected in a special manner to a rectifier so that it does not utilize the remote battery as a reference voltage biasing source.

Further objects of this invention will appear as the description proceeds in connection with the appended claims and the below-described drawing.

DESCRIPTION OF DRAWING

The drawing is a schematic circuit diagram of a telephone transmission system which incorporates a battery charger control circuit according to a preferred embodiment of this invention.

DETAILED DESCRIPTION

Referring to the drawing, a telephone transmission system incorporating the principles of this invention is shown to comprise a central office or central office station 20, a subscriber's station 22 which is located remotely from the central office 20, a subscriber's telephone 23 which is located at the subscriber's station, and a two-conductor telephone transmission line 24 having transmission conductors 26 and 28 which provide the usual connection between telephone 23 and the central office 20. The central office equipment may be conventional and includes, among other things, a central office d.c. power supply source 30.

Source 30 is connected across conductors 26 and 28 through the coils of a line relay 32 so that the terminal or output voltage of source 30 is applied across conductors 26 and 28 at the central office. Line relay 32 is conventionally connected to the switching equipment in the central office.

Source 30 may be any suitable means for providing d.c. voltage. For example, source 30 may be a d.c. generator, a rectifier or a battery. Source 30, which is customarily referred to as the central office battery, is preferably a substantially constant voltage source and usually supplies power for operating central office equipment.

The remote storage battery in this invention is indicated at 34 and is connected across the load or output terminal of a battery charger 36. The battery charger control circuit of this invention is indicated at 40 and is connected between line 24 and charger 36 to draw current from source 30 for powering charger 36.

Battery 34 may be any suitable, conventional rechargeable construction. For example, battery 34 may be of the nickel cadmium type. Charger 36 may be any suitable conventional electrical circuit for charging battery 34.

Battery 34 may be utilized to power any selected equipment which is normally located remotely from central office 20 and which is capable of operation by current drawn from battery 34. For example, battery 34 may be utilized to power one or more of the following pieces of equipment: the unshown ringer in telephone 23, unshown subscriber carrier apparatus in the event that the telephone transmission system is a subscriber carrier system, and an amplifier 42 for a telephone loudspeaker 44.

An example of subscriber carrier apparatus which is battery powered is described in the previously identified U.S. Pat. No. 3,510,584. It will be appreciated that this invention may be utilized with subscriber carrier telephone systems of various types as well as with voice frequency telephone transmission systems.

While control circuit 40, battery 34 and charger 36 are remote from central office 20, they are not necessarily at the subscriber's station 22 or the subscriber's premises. For example, control circuit 40 may be connected to conductors 26 and 28 at any convenient place along line 24 depending upon the remote equipment to be powered.

In this embodiment, battery 34 is shown by way of example to be connected to the power terminals of amplifier 42. The signal input of amplifier 42 is connected to telephone 24 is the usual manner, and the signal output of amplifier 42 is connected to loudspeaker 44.

In this embodiment, control circuit 40 comprises a low pass filter 48, a diode bridge rectifier 50, a pair of capacitors $C_2$ and $C_3$, a PUT (i.e., a programmable unijunction transistor) 52, and a pair of NPN transistors $Q_1$ and $Q_2$.

Filter 48, which is connected between bridge 50 and transmission conductors 26 and 28, may be of any suitable construction for passing direct current and low frequencies of a.c. current to bridge 50 without degrading the normal operation of the telephone transmission circuit which is conventional and which includes telephone 23, transmission line 24 and circuit components in the central office. In this embodiment, filter 48 comprises a pair of balanced inductor coils 56 and 58 and a capacitor $C_1$. Coil 56 connects conductor 26 to one input terminal of rectifier 50, and coil 58 connects conductor 28 to the other input terminal of rectifier 50. Capacitor $C_1$ is connected across the input terminals of rectifier 50 as shown.

Rectifier 50 is effective to make control circuit 40 independent of the polarity of the voltage across conductors 26 and 28. The output terminals of rectifier 50 are indicated at 51 and 51a. With the illustrated diode orientation in rectifier 50, the voltage at terminal 51 is positive with respect to ground, and the voltage at terminal 51a is substantially at zero volts and hence negative with respect to the positive voltage at terminal 51.

It will be appreciated that other circuit constructions or devices may be utilized in place of rectifier 50 to apply a d.c. voltage to the control portion of circuit 40 which is connected across the output terminals of rectifier 50 and which includes capacitors $C_2$ and $C_3$, PUT 52, transistors $Q_1$ and $Q_2$, and other circuit components now to be described.

As shown, the control portion of circuit 40 further includes a voltage divider 60 which consists of resistors $R_1$ and $R_2$ connected in series across the output terminals of rectifier 50. A further resistor $R_3$ and capacitor $C_2$ are connected in series across the output terminals of rectifier 50 in parallel with voltage divider 60. The gate of PUT 52 is connected to the junction between resistors $R_1$ and $R_2$ so that the voltage applied to the gate of PUT 52 is determined by the voltage across the output terminals of rectifier 50 less the voltage drop across resistor $R_1$. The anode of PUT 52 is connected to the junction between capacitor $C_2$ and resistor $R_3$.

A further voltage divider 62 consisting of two series connected resistor $R_4$ and $R_5$ connects the cathode of PUT 52 to the rectifier output terminal 51a. A zener diode 64 is connected in parallel with capacitor $C_2$ and in series with resistor $R_3$. Zener diode 64, as will be described in greater detail later on, is effective to limit the build-up of charge on capacitor $C_2$. Capacitor $C_3$, which is connected between the cathode of PUT 52 and the rectifier output terminal 51a, is in parallel with voltage divider 62 as shown.

With continued reference to the drawing, the rectifier output terminal 51 is connected through a bias resistor $R_6$ to the collector of transistor $Q_1$ and to the base of transistor $Q_2$. Thus, the base of transistor $Q_2$ is connected directly, without any intervening resistors, to the collector of transistor $Q_1$ for a purpose to be described shortly.

The emitters of transistors $Q_1$ and $Q_2$ are connected together and are also connected to the rectifier output terminal 51a. The base of transistor $Q_1$ is connected to the junction between resistors $R_4$ and $R_5$ so that the voltage applied to the base of transistor $Q_1$ is the voltage across divider 62 less the voltage drop across resistor $R_4$.

The collector of transistor $Q_2$ is connected directly to one of the input terminals of battery charger 36, and the positive rectifier output terminal 51 is directly connected to the other input terminal of battery charger 36 as shown. With these circuit connections it will be appreciated that the emitter base junction of transistor $Q_2$ is connected in series with resistor $R_6$ across the output terminals of rectifier 50. The voltage at the rectifier output terminal 51a acts as an emitter reference voltage biasing source for transistors $Q_1$ and $Q_2$.

From the foregoing circuit description it will be appreciated that neglecting the relatively small voltage drop across PUT 52, the potential applied across capacitor $C_3$ will be the same as the potential across capacitor $C_2$ when PUT 52 is conducting.

As known, PUT 52 will switch from a non-conducting to a conducting state when the voltage at its gate becomes sufficiently negative with respect to the voltage applied to its anode. PUT 52, upon being switched to its conducting state, effectively latches in that state and remains conductive as long as sufficient holding current is flowing from its cathode to its anode.

In describing operation of the foregoing circuit, the on-hook condition will be considered first followed by a consideration of the off-hook condition.

When the subscriber's telephone 23 is in its on-hook condition, the telephone transmission circuit is open at the subscriber's telephone, leaving only the telephone bell connected to the line. Thus, the voltage across the transmission conductors 26 and 28 is relatively high. As a result, a relatively high voltage appears across the output terminals of rectifier 50 and consequently is applied across the control portion of circuit 40 when telephone 23 is on-hook.

The two resistors in voltage divider 60 are so proportioned relative to the value of resistor $R_3$ that when telephone 23 is in its on-hook condition to establish a relatively high voltage across the output terminals of rectifier 50, the voltage applied to the gate of PUT 52 is not negative enough with respect to the voltage at the anode of PUT 52 to cause the PUT to switch into a conducting state at the lowest anticipated central office battery voltage. Thus, when telephone 23 is in its on-hook condition and, consequently, when the telephone transmission circuit is in its "idle line" condition, PUT 52 will be in its non-conducting state.

When PUT 52 is non-conducting, capacitor $C_2$ will be charged through resistor $R_3$ to a suitable, preselected value that is determined and limited by zener diode 64. It will be appreciated that by limiting the voltage build-up across capacitor $C_2$, diode 64 has the effect of determining the magnitude of the positive voltage at the anode of PUT 52.

When PUT 52 is in its non-conducting state and with no charge on capacitor $C_3$, no current will flow through voltage divider 62. As a result, the voltage applied to the base of transistor $Q_1$ will be substantially zero and the emitter base junction of transistor $Q_1$ will consequently be reverse biased. Transistor $Q_1$ will therefore be in its non-conducting state when no current is flowing through divider 62.

When transistor $Q_1$ is in its non-conducting state, it will not have the effect of short-circuiting the emitter base junction of transistor $Q_2$. As a result, the voltage which is applied across the output terminals of rectifier 50 and which is also applied across resistor $R_6$ and the emitter base junction of transistor $Q_2$ will forward bias the emitter base junction of transistor $Q_2$ to place transistor $Q_2$ in its conducting state.

When transistor $Q_2$ is in its conducting state, it will be appreciated that it effectively completes a circuit which connects battery charger 36 across the output terminals of rectifier 50. As a result, battery charger 36 will draw current from the central office d.c. power supply source 30 to charge battery 34. This circuit may be traced from the negative side of the d.c. power supply source 30, through transmission conductor 26, through filter 48, through rectifier 50, through the emitter-collector of transistor $Q_2$, through one input terminal of battery charger 36, through the circuit of battery charger 36, through the other input terminal of battery charger 36, and back through rectifier 50, filter 48, and transmission conductor 28 to the positive side of the d.c. power supply source 30. As long as transistor $Q_1$ is non-conducting, transistor $Q_2$ will be held in its conducting state by the positive base bias through resistor $R_6$.

During the idle condition of the telephone transmission circuit, therefore, capacitor $C_2$ will be charged, capacitor $C_3$ will not be charged, PUT 52 will be in its non-conducting state, transistor $Q_1$ will be in its non-conducting state, and transistor $Q_2$ will be in its conducting state. Battery charger 36 will therefore draw current from the d.c. power supply source 30 during the on-hook condition of telephone 23 to charge battery 34. This charging current is limited by battery charger 36 to such a value that the current drain on the telephone transmission circuit for charging the battery will normally not cause any problems or malfunctions in the telephone transmission circuit when it is in its "idle line" condition. Battery charger 36 is effective to charge battery 34 with a current whose magnitude is greater than the magnitude of current which is drawn from line 24.

When the handset of telephone 23 is removed from its switch cradle, the hookswitch contacts 70 in telephone 23 close to connect a resistance network or circuit across transmission conductors 26 and 28 in the conventional manner. This resistance network completes the telephone transmission circuit through the dialing contacts 72 in the telephone to operate relay 32. As a result of operating relay 32, central office equipment is seized in preparation for dialing in the usual manner.

When telephone 23 is placed in its off-hook condition by the closure of hookswitch contacts 70, the current which flows through the coils of relay 32 and through transmission conductors 26 and 28 results in a substantial lowering of the transmission line voltage which is applied across circuit 40. For example, the voltage may be lowered from an idle time condition voltage of approximately 50 volts to an off-hook or busy line voltage of approximately 30 volts or less. Thus, the voltage across divider 60 and the remainder of the control portion of circuit 40 will correspondingly be lowered. This results in the voltage at the junction of resistors $R_1$ and $R_2$ and consequently at the gate of PUT 52 becoming sufficiently negative with respect to the Zener-stabilized voltage at the anode of PUT 52 to switch PUT 52 into its conducting state.

Upon being switched to its conducting state, PUT 52 completes a discharging circuit for capacitor $C_2$. Current will therefore be drawn from the charge built up on capacitor $C_2$ and will flow through PUT 52 to rapidly charge capacitor $C_3$. The capacitance of capacitor $C_2$ is significantly greater than that of capacitor $C_3$. For example, the values of capacitors $C_2$ and $C_3$ may be 15 microfarads and 1 microfarad respectively.

When telephone 23 is transferred to its off-hook condition to complete the transmission circuit back to the central office, the reduced line voltage which is applied across circuit 40 is normally sufficiently high to cause a small biasing current to flow through resistor $R_3$, PUT 52 and resistors $R_4$ and $R_5$ upon switching PUT 52 into its conductive state. This biasing current is small and does not adversely affect operation of the telephone circuit.

As a result of passing the biasing current through voltage divider 62, a voltage drop is developed across resistor $R_4$. Thus, the junction between resistors $R_4$ and $R_5$, which feeds the base of transistor $Q_1$, will become positive with respect to the voltage at the emitter of transistor $Q_1$. The emitter base junction of transistor $Q_1$ will therefore become forward biased, causing transistor $Q_1$ to conduct.

Transistor $Q_1$, upon switching to its conducting state, effectively shorts the positive bias at the base of transistor $Q_2$ to cause transistor $Q_2$ to cease conducting. More particularly, current flowing through the base of transistor $Q_2$ to maintain transistor $Q_2$ in its conducting state will be bled through transistor $Q_1$ when transistor $Q_1$ is switched to its conducting state. Transistor $Q_2$ consequently becomes non-conductive.

When transistor $Q_2$ ceases to conduct, it effectively disconnects battery charger 36 from transmission conductors 26 and 28 to thereby terminate or interrupt the current drain that the telephone transmission circuit was subjected to for charging battery 34. Thus, as soon as telephone 23 is transferred to its off-hook condition, transistor $Q_2$ almost immediately becomes non-conductive with the result that no further current will be drawn by battery charger 36 for charging battery 34.

From the foregoing it will be appreciated that transistor $Q_1$ acts as a trigger for transistor $Q_2$. More particularly, transistor $Q_2$ is controlled by transistor $Q_1$ and performs a switching function for effectively completing and opening the circuit that supplies current to battery charger 36. When PUT 52 is in its non-conducting state, it will be controlled by and responsive to the voltage across transmission conductors 26 and 28. It will be appreciated that when PUT 52 is switched to its conducting state it puts capacitors $C_2$ and $C_3$ in parallel with each other.

Resistors $R_4$ and $R_5$ are relatively large to provide a relatively long discharge time constant for capacitors $C_2$ and $C_3$. The resistance values of these two resistors are furthermore high enough that the current flowing through PUT 52 when the PUT is switched to its conducting state will be less than the minimum holding current level that is required to maintain PUT 52 in its conducting state regardless of variations in the voltage at the gate of the PUT. Consequently, PUT 52 will not remain in conduction when the voltage at its gate becomes more positive than the voltage at its anode.

As is well known, operation of the subscriber's telephone dial, which is conventionally connected in subscriber's telephone 23, causes a succession of open-circuit pulses to be transmitted to the central office to cause a pulsing operation of relay 32 in the central office. The open-circuit condition, which is introduced by the opening of dial contacts 72, instantaneously causes the voltage across transmission conductors 26 and 28 to increase to its relatively high idle-line value just as if the telephone were transferred to its on-hook condition. As a result, the dialing sequence performed by the subscriber at the telephone 23 will cause the voltage at the gate of PUT 52 to shift back and forth between relatively high and low values.

Thus, when the dialing contacts open in telephone 23 to thereby increase the voltage at the gate of PUT 52 to a value which is more positive than the voltage at the anode of PUT 52, PUT 52 will not be able to sustain conduction because of the relatively small amount of current flowing through the PUT. PUT 52 will therefore be switched to its non-conducting state for each opening of the dialing contacts in telephone 23 and will be switched back to its conducting state when the dialing contacts are closed to again complete the telephone transmission circuit and cause the previously mentioned lowering of the voltage across transmission conductors 26 and 28.

When PUT 52 is switched to its non-conducting state during the open dialing contact intervals in the dialing sequence, it interrupts and effectively opens the circuit for feeding the biasing current through resistors $R_3$, $R_4$ and $R_5$. Termination of this current flow, however, does not result in the switching of transistor $Q_1$ to its non-conducting state because of the charge still present on capacitor $C_3$. Thus, during the intervals in the dialing sequence in which the dialing contacts in telephone 23 are open, the charge on capacitor $C_3$ provides a source of emf that causes a biasing current to continue to flow through divider 62. A sufficient voltage drop across resistor $R_4$ will therefore be maintained to keep the voltage at the base of transistor $Q_1$ at a value that maintains transistor $Q_1$ in its conducting state. As long as transistor $Q_1$ remains in its conducting state, transistor $Q_2$ will be maintained in its non-conducting state to prevent current from being drawn by battery charger 36 for charging battery 34.

When PUT 52 is switched back to its conducting state upon re-closure of the dialing contacts, capacitor $C_2$ will replenish the charge on capacitor $C_3$, and the charge on capacitor $C_2$ will be replenished by the applied line voltage provided, of course, that the applied voltage is sufficiently high when telephone 23 is in its off-hook condition. Thus, battery charger 36 will remain effectively disconnected from transmission line 24 during the transmittal of dialing pulses to the central office so that no pulse-distorting current is drawn by battery charger 36 during the transmittal of the dialing pulses to the central office. After the dialing sequence is completed and telephone 23 is still off-hook, PUT 52 will remain in conduction, and biasing current will be fed through divider 62 to maintain transistor $Q_1$ conducting. Transistor $Q_2$ will therefore be held in its non-conducting state for the duration of the period in which telephone 23 is off-hook provided, of course, that the line voltage which is applied across circuit 40 is sufficiently high to keep capacitors $C_2$ and $C_3$ from discharging significantly.

When transistor $Q_2$ is in its non-conducting state, the load is such that the current which is drawn from line 24 is relatively small and not sufficient to cause distortion in the dialing pulses or to disturb normal operation of the telephone transmission circuit.

When telephone 23 is returned to its on-hook condition upon completion of the call, the hookswitch 70 opens, causing the line voltage which is applied across circuit 40 to be restored to its higher idle-line value. This increase in applied voltage is immediately sensed to switch PUT 52 back to its non-conducting state. At this stage, capacitor $C_3$, which is still charged, will begin to discharge through divider 62. A biasing current will consequently still flow through divider 62 to keep transistor $Q_1$ in its conducting state. Transistor $Q_2$ will therefore remain non-conductive to delay the reconnection of charger 36 to line 24 for the period required to discharge capacitor $C_3$ through resistors $R_4$ and $R_5$.

When the charge on capacitor $C_3$ is finally drained off through resistors $R_4$ and $R_5$, the termination of current flow through voltage divider 62 will place the voltage at the base of transistor $Q_1$ at such a value that the emitter base junction of transistor $Q_1$ will become reverse biased. As a result, transistor $Q_1$ will switch to its non-conducting state.

When transistor $Q_1$ switches to its non-conducting state, it no longer shorts the positive base bias which is developed through resistor $R_6$ for transistor $Q_2$. As a result, transistor $Q_2$ will switch back to its conducting state, and battery charger 36 will again be connected to line 24 and therefore will again begin to draw current from source 30 for charging battery 34.

From the foregoing description it will be appreciated that the charge on capacitor $C_3$ temporarily delays the reconnection of charger 36 to line 24 after telephone 23 is returned to its on-hook condition. Thus, no battery charging current will be drawn for a predetermined interval following the return of telephone 23 to its on-hook condition. This interval is sufficiently long to allow the slow-to-release central office relays and other equipment to operate properly for returning the subscriber's line to its idle state when telephone 23 is hung up. As a result, circuit lock-up is avoided.

To make a line insulation test with such equipment as the Western Electric ALIT, transmission line 24 is first disconnected from line relay 32 by a suitable switching means 80 and then, after a short delay, connected to the line insulation test equipment which is indicated at 82 and which checks for current leakage. Switching means 80 may be any suitable device or devices such as relays. With the Western Electric ALIT, the break time (i.e., the interval in which transmission line 24 is connected neither to the central office equipment nor to the test equipment) is very short and is approximately 10 milliseconds. During this break time the voltage across conductors 26 and 28 is reduced to zero volts because line 24 is disconnected from source 30.

Circuit 40, in sensing the line voltage, responds to this line voltage reduction in the previously described manner to switch PUT 52 into conduction substantially as soon as the line voltage collapses to zero volts. As a result, capacitor $C_2$, which was charged during the preceding idle-line condition, will transfer a portion of its charge to charge up capacitor $C_3$ as previously described. The charging time constant for capacitor $C_3$ is sufficiently short that capacitor $C_3$ will be adequately charged within the 10 millisecond break time.

When transmission line 24 is connected to the line insulation testing equipment the line voltage which is applied across circuit 40 is restored by a power source in the test equipment to a value that normally switches PUT 52 back to its non-conducting state. At this stage, however, capacitor $C_3$ will discharge to feed a biasing current through resistors $R_4$ and $R_5$. Transistor $Q_1$ will therefore turn on to cause transistor $Q_2$ to turn off as previously described. Battery charger 36 will consequently be disconnected from line 24 and no battery charging current will be drawn for the interval that capacitor $C_3$ is discharging through resistors $R_4$ and $R_5$.

The time for discharging capacitor $C_3$ is made sufficiently long to cover the duration of the automatic line insulation test. In this embodiment, the time for discharging capacitor $C_3$ may be about 30 seconds for the line testing conditions mentioned above. Thus, the interval in which charger 36 is effectively disconnected from line 24 and is thereby not drawing battery charging current is sufficiently long to cover a manually run line insulation test in which the break and make operations and the test are manually performed on a test board in the central office.

When the charge on capacitor $C_3$ is drained off, transistor $Q_1$ turns off to re-establish the conditions that will cause transistor $Q_2$ to turn on when line voltage is restored across circuit 40.

If the previously mentioned break time is longer than the time which is required to charge capacitor $C_3$ through PUT 52, both capacitors $C_2$ and $C_3$ will begin to discharge through resistors $R_4$ and $R_5$ during the break time to switch transistor $Q_1$ to its conducting state. As a result, transistor $Q_2$ will turn off to effectively disconnect charger 36 from line during the break time or switching interval. When voltage is restored across the line to switch PUT 52 to its non-conducting state, then only capacitor $C_3$ will continue to discharge through resistors $R_4$ and $R_5$ to keep transistor $Q_1$ in its non-conducting state.

In place of PUT 52 other electronic devices, which are capable of performing a switching or circuit-completing operation, may be utilized. For example, an SCR unijunction or other trigger-type electronic device may be used in circuit 40 in place of PUT 52.

It will be appreciated that the construction of circuit 40 is such that it enables a transistor ($Q_2$) to be utilized as a switching device for effectively disconnecting charger 36 from line 24 without depending upon battery 34 as a transistor-biasing reference voltage source.

Finally, it is apparent that the particular equipment which is selected to be powered by battery 34 is not pertinent insofar as the novel aspects of this invention are concerned.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of temporarily electrically disconnecting a rechargeable, equipment-powering battery from a plural conductor transmission line in a telephone transmission circuit in which a telephone is electrically connected by said line to a central office, and in which said battery is located remotely from the central office and is normally electrically connected to said line when said line is idle to be recharged by current fed down said line from a d.c. power source which is located at said central office, said method comprising the steps of electrically disconnecting said battery from said line and charging a capacitor either upon transferring said telephone from its on-hook condition to its off-hook condition or upon disconnecting said line from said source, and utilizing the charge stored on said capacitor to temporarily delay the reconnection of said battery to said line following establishment of a condition in which said telephone is in its on-hook condition and said line is electrically connected to a selected power source.

2. A method of temporarily electrically disconnecting a rechargeable, equipment-powering battery from a plural conductor transmission line in a telephone transmission circuit in which a telephone is electrically connected by said line to a central office, in which said battery is electrically connected to said line remotely from said central office, in which a d.c. power supply source is electrically connected to said line at said central office to develop an applied voltage for charging said battery when said telephone is in its on-hook condition, and in which said applied voltage decreases from an idle line value which exists when said telephone is in its on-hook condition and said line is idle to a predetermined value when said telephone is transferred to its off-hook condition to close its hookswitch, said method comprising the steps of electrically disconnecting said battery from said line when said applied voltage decreases to at least said predetermined value, charging a capacitor, and utilizing the charge stored on said capacitor to temporarily delay the reconnection of said battery to said line for a predetermined time period following restoration of the decreased voltage to said idle line value, said predetermined period being longer than the duration of each dialing pulse which transmitted by said line from said telephone to said central office.

3. A method of temporarily electrically disconnecting a rechargeable, equipment-powering battery from a plural conductor transmission line in a telephone transmission circuit in which a telephone is electrically connected by said line to a central office, and in which said battery is located remotely from said central office and is normally electrically connected to said line when said line is idle to be recharged by current fed down said line from a d.c. power source which is located at said central office, said method comprising the steps of electrically disconnecting said battery from said line and charging a capacitor either when said telephone is transferred from its on-hook condition to its off-hook condition or when said line is electrically disconnected from said source, and utilizing the charge stored on said capacitor to temporarily delay the reconnection of said battery to said line for a predetermined time period following the establishment of a condition in which said telephone is in its on-hook condition and said line is electrically connected to a selected power source.

4. A method of temporarily disconnecting a rechargeable, equipment-powering battery from a plural conductor transmission line in a telephone transmission circuit in which a telephone is electrically connected by said line to a central office, in which a central office d.c. power supply source is electrically connected to said line to apply a voltage across the conductors of said line, and in which said battery is located remotely from said central office and is normally electrically connected to said line when said line is idle to be charged by current which is fed down said line from said central office d.c. power source, said method comprising the steps of charging a first capacitor during the period when said line is idle and electrically connected to said power source, effectively disconnecting said battery from said line and transferring a portion of the charge on said first capacitor to charge a second capacitor when said telephone is transferred to its off-hook condition or when said line is electrically disconnected from said power source, and utilizing the charge stored on said second capacitor to temporarily delay the reconnection of said battery to said line for a predetermined time period following the establishment of a condition in which said telephone is in its on-hook condition and said line is electrically connected to a selected power source.

5. A method of temporarily electrically disconnecting a rechargeable, equipment-powering battery from a plural conductor transmission line in a telephone transmission circuit in which a telephone is electrically connected by said line to a central office, in which a central office d.c. power supply source is electrically connected to said line to apply a voltage across the conductors of said line, and in which said battery is located remotely from said central office and is normally electrically connected to said line when said line is idle to be charged by current which is fed down said line from said central office d.c. power source, said method comprising the steps of feeding current from said source to store a charge on a first capacitor during the period when said line is idle and electrically connected to said power source, effectively electrically disconnecting said battery from said line and transferring a portion of the charge on said first capacitor to charge a second capacitor when said telephone is transferred to its off-hook condition or when said line is electrically disconnected from said power source, and utilizing the charge stored on said second capacitor to temporarily delay the reconnection of said battery to said line for a predetermined time period following the occurrence of a condition in which said telephone is in its on-hook condition and said line is connected either to said central office d.c. power source or to a power source in line insulation testing equipment.

6. A method of temporarily electrically disconnecting a rechargeable, equipment-powering battery from a plural conductor transmission line in a telephone transmission circuit in which a telephone is electrically connected by said line to a central office, in which a central office d.c. power supply source is electrically connected to said line to apply a voltage across the conductors of said line, and in which said battery is located remotely from said central office and is normally electrically connected to said line when said line is idle to be charged by current which is fed down said line from said central office d.c. power source, said method comprising the steps of feeding current from said source to store a charge on a first capacitor during the idle line period when said telephone is in its on-hook condition and said line is electrically connected to said source, effectively electrically disconnecting said battery from said line and transferring a portion of the stored charge to charge a second capacitor when the voltage along said line decreases by at least a pre-selected amount from an idle line value which is present when said telephone is in its on-hook condition and said line is electrically connected to said source, and utilizing the charge stored on said second capacitor to temporarily delay the reconnection of said battery to said line for a predetermined time period following restoration of the decreased voltage to at least a pre-selected value.

7. A method of effecting electrical connections for conducting a line insulation test on a plural conductor transmission line in a telephone transmission system having a central office d.c. power source which is normally electrically connected to said line, and a rechargeable battery which is normally electrically connected to said line remotely from a central office to draw battery-charging current from said source when said line is idle, said method comprising the steps of electrically disconnecting said line from said central office d.c. power source, thereafter electrically connecting said line to line insulation testing equipment, effectively electrically disconnecting said battery from said line substantially at the time when said line is electrically disconnected from said central office d.c. power source, charging a capacitor during the break time when said line is connected neither to said central office d.c. power source nor to said test equipment, and utilizing the charge stored on said capacitor during the break time to temporarily delay the reconnection of said battery to said line following the connection of said line to said test equipment.

8. A method of effecting electrical connections for conducting a line insulation test on a plural conductor transmission line in a telephone transmission system having a telephone connected by said line to a central office, a central office d.c. power source which is normally electrically connected to said line, and a rechargeable battery which is normally electrically connected to said line remotely from a central office to draw battery-charging current from said source when said line is idle, said method comprising the steps of storing a charge on a first capacitor during the period when said telephone is in its on-hook condition and said central office d.c. power source is electrically connected to said line, electrically disconnecting said line from said central office d.c. power source, thereafter electrically connecting said line to line insulating testing equipment, effectively electrically disconnecting said battery from said line substantially at the time when said line is electrically disconnected from said central office d.c. power source, transferring a portion of the charge stored on said first capacitor to charge a second capacitor during the break time when said line is connected neither to central centrall office d.c. power source nor to said test equipment, and utilizing the charge stored on said second capacitor during the break time to temporarily delay the reconnection of said battery to said line following the connection of said line to said test equipment.

9. A telephone transmission system comprising a transmission line, a telephone electrically connected by said line to a central office, a d.c. power source located at said central office and electrically connected to said line to provide a supply of direct current to said line, an equipment-powering, rechargeable battery, and means electrically connecting said battery to said line remotely from said central office and comprising a disconnect control circuit normally conditioned when said line is idle to pass direct durrent which is fed down said line from said source for recharging said battery, said telephone having the effect upon being transferred from its on-hook condition to its off-hook condition to decrease the transmission line voltage which is applied to said control circuit from an idle line value to a predetermined value, and said control circuit comprising a capacitor, means for accumulating a charge on said capacitor when said line is idle, circuit means responsive to a decrease in the applied transmission line voltage to said predetermined value or momentarily to zero to complete a discharging circuit for discharging said capacitor and to stop the flow of battery charging current from said line, and said circuit means including means rendered effective by the discharging of said capacitor to temporarily keep battery charging current from being drawn from said line for a pre-selected time interval which is independent of the charging time constant for said capacitor and which starts with the restoration of said applied transmission line voltage to a value greater than said predetermined value.

10. In a telephone transmission system, a two-conductor transmission line, a telephone connected by said line to a central office, and a central source of d.c. power electrically connected across the conductors of said line to apply a d.c. voltage across said conductors, a rechargeable battery located remotely from said central office for powering equipment which is also remote from said central office, a battery charger connected to said battery for charging said battery, and a battery charger control circuit connected between said line and said charger and comprising a rectifier having a pair of output terminals, means connecting said rectifier to said line to provide a d.c. voltage across the rectifier output terminals, said rectifier being effective to maintain the voltage at one of its output terminals substantially constant with respect to ground, a semiconductor device having first and second terminals and a control terminal for controlling flow of current between said first and second terminals, said first terminal being connected to said one of said rectifier output terminals, and said charger being connected between said second terminal and the other of said rectifier output terminals, means connecting said control terminal to said other of said rectifier output terminals to condition said device in a conducting state in which it provides for the flow of current through said first and second terminals to power said charger when said telephone is in its on-hook condition and said source is connected across said conductors, and circuit means connected to said semiconductor device and rendered effective by the transfer of said telephone from its on-hook condition to its off-hook condition to temporarily switch said semiconductor device to a non-conductive state, said semiconductor device being effective in its non-conducting state to substantially terminate the flow of current between said first and second terminals.

11. The telephone transmission system defined in claim 10 wherein said semiconductor device is a transistor.

12. In a telephone transmission system, a two-conductor transmission line, a telephone connected by said line to a central office, and a central office source of d.c. power connected across the conductors of said line to apply a d.c. voltage across said conductors, a rechargeable battery located remotely from said central office for powering equipment which is also remote from said central office, a battery charger connected to said battery for charging said battery, and a battery charger control circuit connected between said line and said charger and comprising a rectifier having a pair of output terminals, means connecting said rectifier to said line to provide a d.c. voltage across said output terminals of said rectifier, said rectifier being effective to maintain the voltage at one of its output terminals substantially constant with respect to ground, a first transistor having first, second, and third terminals, said first terminal being connected to said one of said rectifier output terminals, and said charger being connected to said second terminal and to the other of said rectifier output terminals, means connecting said third terminal to the other of said rectifier output terminals to bias said first transistor into a conducting state that supplies current to said charger when said telephone is in its on-hook condition and said source is connected across said conductors, a second transistor connected to said first transistor, said second transistor being effective in its conducting state to switch said first transistor to its non-conducting state, said first transistor being effective in its non-conducting state to substantially terminate the flow of current to said charger, and circuit means rendered effective by the transfer of said telephone from its on-hook condition to its off-hook condition to switch said second transistor to its conducting state, said circuit means also being rendered effective by the transfer of said telephone back to its on-hook condition to switch said second transistor to its non-conducting state following a preselected time delay after said telephone is returned to its on-hook condition.

13. In combination with a battery charger, a battery charger control circuit for connecting said battery charger to a transmission line in a telephone transmission circuit for drawing current from a central office d.c. power to power said battery charger when a telephone, which is connected by said line to said central office, is in its on-hook condition, said battery charger control circuit comprising a rectifier having a pair of output terminals, means adapted to connect said rectifier to said line to provide a d.c. voltage across the output terminals of said rectifier, said rectifier being effective to maintain the voltage at one of its output terminals substantially constant with respect to ground, a semiconductor device having first and second terminals and a control terminal, said first terminal being connected to said one of said rectifier output terminals, and said charger being connected to said second terminal and to the other of said rectifier output terminals, means connecting said control terminal to said other of said rectifier terminals for conditioning said semiconductor device to supply current to said charger, and further means connected to said control terminal and rendered effective by the transfer of said telephone to its off-hook condition to substantially temporarily terminate the flow of current between said first and second terminals for a time period that exceeds the interval during which said telephone is in its off-hook condition.

14. The combination defined in claim 13, wherein said semiconductor device is a transistor.

15. In combination with a battery charger, a battery charger control circuit for connecting said battery charger to a transmission line in a telephone transmission circuit for drawing current from a central office d.c. power source to power said battery charger when a telephone, which is connected to said transmission line is in its on-hook condition, said battery charger control circuit comprising a rectifier having a pair of output terminals, means for connecting said rectifier to said line to provide a d.c. voltage across the output terminals of said rectifier, said rectifier being effective to maintain the voltage at one of its output terminals substantially constant with respect to ground, a first transistor having first, second and third terminals, asaid first terminal being connected to said one of said rectifier output terminals, and said charger being connected to said second terminal and to the other of said rectifier output terminals, means connecting said third terminal to said other of said rectifier output terminals for biasing said first transistor into a conducting state which feeds current to said charger, a second transistor connected to said first transistor, said second transistor being effective in its conducting state to condition said first transistor to substantially terminate the supply of current to said charger, and circuit means connected to said rectifier and said second transistor and responsive to the transfer of said telephone to its off-hook condition to temporarily switch and second transistor to its conducting state for a period that exceeds the interval during which said telephone is in its off-hook condition.

16. In a telephone transmission system, a plural conductor transmission line, a central office d.c. source of power electrically connected across the conductors of said line to apply a voltage across said conductors, a rechargeable, equipment-powering battery located remotely from said central office, a control circuit for electrically connecting said battery to said line to draw battery-charging current from said source, line testing equipment, and means for electrically disconnecting said line from said source and for connecting said line to said testing equipment after said line a certain break time after the disconnection of said line from said source, said control circuit comprising a capacitor, means for charging said capacitor during the break time in which said line is disconnected from both said source and said test equipment, and means for utilizing the charge stored on said capacitor to temporarily prevent battery charging current from being drawn from said line for a predetermined time following the connection of said line to said test equipment.

17. The telephone transmission defined in claim 16 wherein said means for charging said capacitor comprises a further capacitor and means for charging said further capacitor when said line is idle and electrically connected to said source.

18. The telephone transmission system defined in claim 16 wherein said test equipment provides for the line insulation testing of said transmission line.

19. In a battery disconnect control circuit for electrically connecting a rechargeable, equipment-powering battery to a plural conductor transmission line which electrically connects a telephone to a central office and which is electrically connected to a d.c. power source at the central office, said battery disconnect control circuit comprising a capacitor, circuit means controlled by the applied voltage on said line for passing current which is fed down said line from said source to charge said battery when said line is idle, said circuit means being responsive to a decrease in said voltage to a pre-selected magnitude or zero to prevent battery charging current from being drawn from said line and to charge said capacitor, and switching means forming a part of said circuit means and conditioned by the charge on said capacitor to continue to temporarily prevent battery charging current from being drawn from said line for a predetermined interval after said voltage is restored to a value which is greater than said pre-selected magnitude.

20. In a telephone transmission system, a plural conductor transmission line for connecting a telephone to a central office, a central office source of d.c. power electrically connected across the conductors of said line to apply voltage across said conductors, a rechargeable equipment-powering battery located remotely from said central office, and a control circuit, said conductors being connected to said control circuit remotely from said central office to apply an input voltage across said control circuit, said control circuit comprising first switching means which is effective in a first condition to connect said battery to said line to draw battery charging current from said line and which is effective in a second condition to effectively disconnect said battery from said line, first and second capacitors, means for charging said first capacitor during the period when said telephone is in its on-hook condition, second switching means responsive to a lowering of said input voltage that is caused by the transfer of said telephone to its off-hook condition or by the disconnection of said line from said source to complete a circuit for switching said first switching means to said second condition and for transferring a portion of the charge stored on said first capacitor to charge said second capacitor, said second switching means being further responsive to the restoration of the lowered input voltage to at least a pre-selected value to effectively open the circuit that it completed in response to the lowering of said input voltage, and means for applying the charge on said second capacitor to temporarily delay the transfer of said first switching means back to said first condition following the restoration of said input voltage to at least said preselected value.

21. In a telephone transmission system having a transmission line, a telephone connected by said line to a central office, a central office source of d.c. power electrically connected to said line, and a rechareable, equipment-powering battery located remotely from said central office, a disconnect control circit, said battery being electrically connected through said control circuit to said line to draw battery-charging current from said source when said line is idle and electrically connected to said source, and said control circuit being responsive to the transfer of said telephone from its on-hook condition to its off-hook condition to prevent battery charging current from being drawn from said line, said control circuit comprising a capacitor, means for charging said capacitor upon transferring said telephone from its on-hook condition to its off-hook condition, and means utilizing the charge on said capacitor to prevent battery charging current from being drawn from said line for a predetermined time interval following return of said telephone to its on-hook condition.

22. In a telephone transmission system having a transmission line, a telephone connected by said line to a central office, a central office source of d.c. power electrically connected to said line, and a rechargeable equipment-powering battery located remotely from said central office, a disconnect control circuit, said battery being electrically connected through said control circuit to said line to draw battery-charging current from said source when said line is idle, and said control circuit being responsive to the transfer of said telephone from its on-hook condition to its off-hook condition to electrically disconnect said battery from said line, said control circit comprising first and second capacitors, means for charging said first capacitor when said line is idle, means for transferring at least a portion of the charge stored on said first capacitor to charge said second capacitor in response to the transfer of said telephone from its on-hook condition to its off-hook condition, and means utilizing the charge stored on said second capacitor to temporarily delay the reconnection of said battery to said line for a predetermined time period following the restoration of said line to its idle condition by returning said telephone to its on-hook condition.

* * * * *